United States Patent [19]
Tamura et al.

[11] Patent Number: 5,588,410
[45] Date of Patent: Dec. 31, 1996

[54] AIR-FUEL RATIO CONTROL METHOD

[75] Inventors: Hiroki Tamura; Naoki Yamazaki; Akihiro Takeyama; Hitoshi Kamura, all of Tokyo; Tetsuo Maeda, Himeji, all of Japan

[73] Assignees: Mitsubishi Jidosha Kogyo Kabushiki Kaisha; Mitsubishi Denki Kabushiki Kaisha, both of Tokyo, Japan

[21] Appl. No.: 532,669

[22] PCT Filed: Apr. 6, 1995

[86] PCT No.: PCT/JP95/00680

§ 371 Date: Oct. 12, 1995

§ 102(e) Date: Oct. 12, 1995

[87] PCT Pub. No.: WO95/27846

PCT Pub. Date: Oct. 19, 1995

[30] Foreign Application Priority Data

Apr. 7, 1994 [JP] Japan ................................. 6-069265

[51] Int. Cl.⁶ .................................................. F02D 41/14

[52] U.S. Cl. ............................................ 123/416; 123/673

[58] Field of Search ..................................... 123/443, 673, 123/691, 692, 406, 416, 417

[56] References Cited

U.S. PATENT DOCUMENTS 4,027,637  6/1977  Aono .................................. 123/443 X
5,429,104  7/1995  Kondou .................................. 123/692

FOREIGN PATENT DOCUMENTS 62-17341   1/1987  Japan .
4-295151  10/1992  Japan .

*Primary Examiner*—Tony M. Argenbright

[57] ABSTRACT

An air-fuel ratio of respective (individual) cylinders of an engine is changed individually from a stoichiometric air-fuel ratio to a lean air-fuel ratio with the change timing of each of respective cylinders deviated and the intake air flow into an engine 11 is changed gradually by opening an air bypass valve in parallel to the changing of the air-fuel ratio. Concurrent change of ignition timing is also disclosed.

20 Claims, 4 Drawing Sheets

AIR-FUEL RATIO CONTROL METHOD

TECHNICAL FIELD

1. Background Art

The present invention relates to an air-fuel ratio control method for engines which are driven by changing the air-fuel ratio between a stoichiometric air-fuel ratio and a lean air-fuel ratio.

2. Description of the Prior Art

Engines which are driven mainly under an air-fuel ratio greater than a stoichiometric air-fuel ratio, namely, a lean air-fuel ratio, have been provided because of such advantages as reduction of exhaust gas and improvement of fuel consumption.

However, such engines are also run at the stoichiometric air-fuel ratio when they are slowly accelerated at the request of exhaust gas and drivability.

A significant torque gap occurs between such an operation under the stoichiometric air-fuel ratio and an operation under the lean air-fuel ratio, as shown in FIG. 4 which illustrates a relationship between the air-fuel ratio and the torque. Thus, the engine stalls due to the torque gap when operation under the stoichiometric air-fuel ratio proceeds to operation under the lean air-fuel ratio.

For this reason, a conventional suction system comprises air bypass valves. These air bypass valves are opened to increase the intake air flow when the operation under the stoichiometric air-fuel ratio is changed to the operation under the lean air-fuel ratio. At the same time, the intake air flow is finely adjusted by means of an idle speed control valve (hereinafter referred to as ISC valve) in order to prevent the torque from dropping.

However, in a high load area where the pressure in the suction pipe (negative pressure) is low, the air does not increase to a satisfactory level. Accordingly, it is impossible to correct the torque gap completely, which sometimes hesitates upon changing of the air-fuel ratio.

The above mentioned problem may be solved by, for example, changing the air-fuel ratio slowly. This method is, however, not practical because of the resultant increase in Nox as shown in FIG. 5 caused during the changing from the stoichiometric air-fuel ratio to the lean air-fuel ratio.

Japanese Patent Laid-open (Tokkaisho) No. 62-17341 discloses a technique in which the lean air-fuel ratio is changed to the stoichiometric air-fuel ratio in engine for each respective cylinder. However, this technique may be subject to a drop of torque, causing the engine to stall upon changing of the air-fuel ratio.

Accordingly, it is an object of the present invention to reduce torque fluctuation caused by changing the air-fuel ratio in an engine driven by changing the air-fuel ratio between a stoichiometric air-fuel ratio and a lean air-fuel ratio, and further to reduce the output of NOx.

DISCLOSURE OF INVENTION

According to the first aspect of the present invention, there is provided an air-fuel ratio control method for selecting a stoichiometric air-fuel ratio and a lean air-fuel ratio as a target air-fuel ratio for an engine to control the air-fuel ratio of the engine depending on the selected target air-fuel ratio, wherein the air-fuel ratios of respective cylinders of the engine are changed individually for the respective cylinders with the change timing deviated from each other when the target air-fuel ratio is changed from one to the other between the stoichiometric air-fuel ratio and the lean air-fuel ratio, and the air flow to the engine is increased during the changing of the air-fuel ratio.

In the air-fuel ratio control method according to the first aspect of the present invention, changing of the air-fuel ratio between the stoichiometric air-fuel ratio and the lean air-fuel ratio is achieved gradually for respective cylinders with the changing of the timing deviated from each other, so that it is possible to prevent generation of NOx. Further, the air flow into the engine is increased along with the changing of the air-fuel ratio, so that it is possible to prevent reduction of engine torque during the changing of the air-fuel ratio. This prevents the sudden engine hesitation.

According to the second aspect of the present invention, in the structure of the above mentioned first aspect, the changing of the air-fuel ratio in a single cylinder is achieved through a number of steps.

In the air-fuel ratio control method according to the second aspect of the preset invention, the air-fuel ratio is changed gradually through a number of steps, so that it is possible to suppress torque fluctuation more as compared in a case in which the air-fuel ratio is changed all at once. Further, the changing of the air-fuel ratio is performed in respective cylinders, so that it is possible to restrict the generation of NOx to a low level.

According to the third aspect of the present invention, in the structure of the above mentioned second aspect, the air-fuel ratio is changed by means of changing a target air-fuel ratio by a predetermined value at each step.

In the air-fuel ratio control method according to the third aspect of the present invention, the constant change in air-fuel ratio makes it possible to smooth out the torque fluctuation.

According to the fourth aspect of the present invention, in the structure of the above mentioned first aspect, the changing of the air flow is achieved through a path which bypasses a throttle valve provided in a suction path of the engine.

In the air-fuel ratio control method according to the fourth aspect of the present invention, the air flow can be increased independently of the operation of the throttle valve. Accordingly, a necessary mechanism may be disposed separately from a link mechanism between an accelerator pedal and the throttle valve. This eliminates the necessity of complicated construction.

According to the fifth aspect of the present invention, in the structure of the above mentioned first aspect, the changing of the air flow is achieved gradually in interval almost equal to the period of time from the start of changing the target air-fuel ratio to completion of the changing of the target air-fuel ratio.

In the air-fuel ratio control method according to the fifth aspect of the present invention, the air flow is increased for almost the entire period in which the torque is generated during the changes of the air-fuel ratio, so that it is possible to prevent the reduction of torque.

According to the sixth aspect of the present invention, in the structure of the above mentioned first aspect, the air flow is changed gradually by using an operational delay of a mechanism which supplies air to the engine.

In the air-fuel ratio control method according to the sixth aspect of the present invention, no control is required for changing the air flow gradually because of the operational delay of the air supplying mechanism. It is thus possible to provide a simple, cost-effective air-fuel ratio control method.

According to the seventh aspect of the present invention, in the structure of the above mentioned first aspect, the air flow is changed gradually by means of controlling the operation of a mechanism for supplying air to the engine.

In the air-fuel ratio control method according to the seventh aspect of the present invention, an increase in air flow can be adjusted accurately by means of controlling the air supplying mechanism. Further, the air flow can be increased in accurate synchronism with the period from start of changing of the air-fuel ratio to termination thereof.

According to the eighth aspect of the present invention, in the structure of the above mentioned seventh aspect, the mechanism for supplying air to the engine is a path which bypasses a throttle valve provided in the suction path of the engine, and the air flow is changed gradually by means of controlling the degree of opening of the bypass path.

In the air-fuel ratio control method according to the eight aspect of the present invention, it is possible to increase the air flow independently of the operation of the throttle valve. Accordingly, a necessary mechanism may be disposed separately from a link mechanism between the accelerator pedal and the throttle valve.

According to the ninth aspect of the present invention, in the structure of the above mentioned first aspect, the change timing of the air-fuel ratio is earlier for cylinders located on both ends of an alignment of cylinders arranged in series than the other cylinders thereof.

In the air-fuel ratio control method according to the ninth aspect of the present invention, the air-fuel ratio is changed from cylinders located on both sides. It is thus possible to prevent generation of vibration which otherwise occurs due to imbalance of the torque among the cylinders.

According to the tenth aspect of the present invention, in the structure of the above mentioned first aspect, the ignition timing of the engine is advanced gradually along with the changing of the air-fuel ratio when stoichiometric air-fuel ratio is changed to lean air-fuel ratio.

In the air-fuel ratio control method according to the tenth aspect of the present invention, it is possible to secure the optimum combustion condition even with the lean air-fuel ratio by means of advancing the ignition timing as the air-fuel ratio becomes larger.

According to the eleventh aspect of the present invention, there is provided an air-fuel ratio control method for selecting a stoichiometric air-fuel ratio and a lean air-fuel ratio as a target air-fuel ratio for an engine to control the air-fuel ratio of the engine depending on the selected target air-fuel ratio, wherein the air-fuel ratios of respective cylinders of the engine are changed individually for the respective cylinders with the change timing deviated from each other when the target air-fuel ratio is changed between either one of the other. The stoichiometric air-fuel ratio and the lean air-fuel ratio, and the changing of the air-fuel ratio in the respective cylinders is performed gradually through a number of steps.

In the air-fuel ratio control method according to the eleventh aspect of the present invention, the changing of the air-fuel ratio between the stoichiometric air-fuel ratio and the lean air-fuel ratio is achieved gradually for respective cylinders with the changed timing deviated from each other, so that it is possible to prevent generation of NOx. Furthermore, the air-fuel ratio is changed gradually through a number of steps. This makes it possible to suppress torque fluctuation more as compared with to the case in which the air-fuel ratio is changed all at once.

According to the twelfth aspect of the present invention, in the structure of the above mentioned eleventh aspect, the ignition timing is changed gradually in intervals from when the changing of the air-fuel ratio begins in a cylinder in which the initial changing of the air-fuel ratio is performed to when the changing of the air-fuel ratio is terminated in a cylinder in which the final changing of the air-fuel ratio is performed.

In the air-fuel control method according to the twelfth aspect of the present invention, it is possible to prevent generation of NOx by means of gradually changing the air-fuel ratio between the stoichiometric air-fuel ratio and the lean air-fuel ratio, in respective cylinders with the timing deviated between respective cylinders. Further, it is possible to suppress the torque fluctuation more as compared with a case in which the air-fuel ratio is changed all at once, by means of changing the air-fuel ratio gradually through a number of steps. Still further, it is possible to secure the optimum combustion condition even with the lean air-fuel ratio by means of advancing the ignition timing as the air-fuel ratio becomes larger.

BEST MODE FOR CARRYING OUT THE INVENTION

The present invention will be described more in detail with respect to the preferred embodiments thereof in conjunction with the accompanying drawings.

Figure 1:
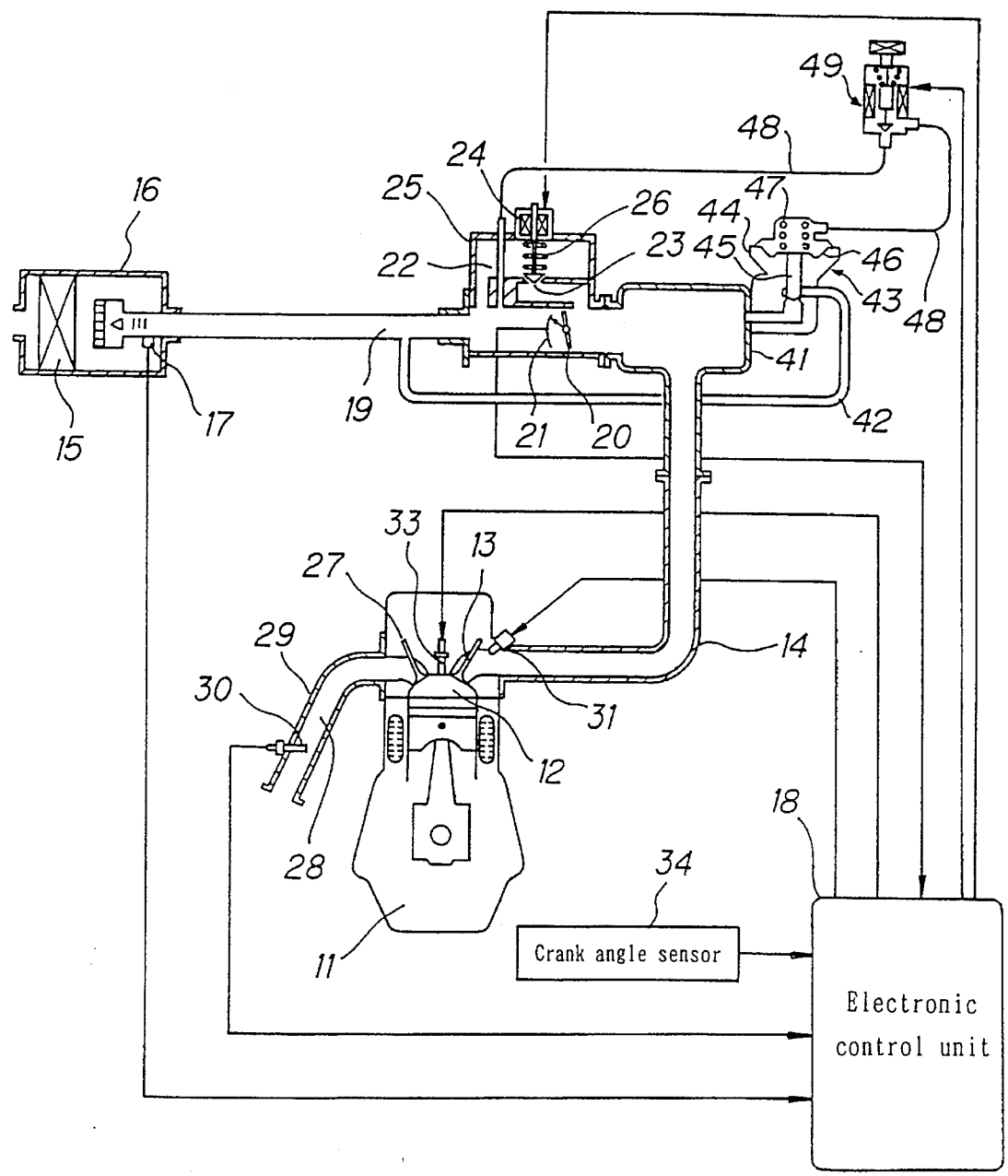
FIG. 1 is a schematic diagram of the entire structure of an engine containing an air-fuel ratio control apparatus according to an embodiment of the present invention.

As shown in FIG. 1, an air cleaner 16 having an air cleaner element 15 is provided at one end of a suction pipe 14 the proximal end of which communicates with a combustion chamber 12 of an engine 11 through an intake valve 13. This air cleaner 16 has an air flow sensor 17 incorporated therein for detecting the air flow into the combustion chamber 12 of the engine 11. The air flow sensor 17 supplies a detection signal to an electronic control unit (ECU) 18.

A throttle valve 20 is provided in the course of the above mentioned suction pipe 14 for changing the opening of the suction path 19 formed in the suction pipe 14 in cooperation with an acceleration pedal (not shown) in order to adjust the intake air flow into the combustion chamber 12. This throttle valve 20 comprises a throttle opening sensor 21 which detects the degree of the opening of the throttle valve 20 to supply a detected opening to the above mentioned ECU 18.

A needle valve 23 is provided in an idle adjusting path 22 which bypasses the upstream and the downstream of the throttle valve 20 and which is connected with the suction path 19 to adjust, if necessary, the degree of the opening thereof. A solenoid 24 is coupled with the needle valve 23 and the solenoid 24 is controlled by the above mentioned ECU. A compression coil spring 26 is interposed between the needle valve 23 and the bypass pipe 25 defining the idle adjusting path 22 for applying tension to the needle valve 23 so as to block the idle adjusting path 22.

Thus, when the solenoid 24 is duty-controlled by the above mentioned ECU 18 against the force of the compression spring 26, the timing of the opening of the needle valve 23 is controlled. As a result, air is sucked into the combustion chamber 12 through the idle adjusting path 22. The idle adjusting path 22 and the needle valve 23 act to reduce the rotation speed of the engine 11 to its possible extent when the engine 11 is in idling in order to improve fuel consumption. In the air-fuel ratio control system, this action is used as means for adjusting the air flow.

On the other hand, an $O_2$ sensor 30 for detecting the concentration of oxygen in the exhaust gas discharged from the combustion chamber 12 is provided, facing the exhaust path 28, in an exhaust pipe 29 where the exhaust path 28 connects with the combustion chamber 12 of the engine 11 is formed through the exhaust valve 27. A signal from this $O_2$ sensor 30 is supplied to the above mentioned ECU 18. The ECU corrects the fuel supply amount according to the detected signal from the $O_2$ sensor 30.

A fuel injection valve 31 of a fuel injection unit is disposed in the above mentioned suction path 19 downstream thereof to inject fuel into the combustion chamber 12 of the engine 11. The opening interval of the fuel injection valve 31 is controlled by the ECU 18. In other words, the control of the opening interval allows adjustment of the amount of fuel supplied to the combustion chamber 12. When a predetermined air-fuel ratio is reached, the fuel is ignited in the combustion chamber 12 by means of an spark plug 33.

The ECU 18 also receives a detection signal supplied from a crank angle sensor 34. The ECU 18 calculates the rotation speed N of the engine 11 according to these signals. Then, load A/N with respect to the engine 11 is calculated from the rotation speed N and detection signal from the air flow sensor 17.

An air bypass path 42 is provided from the upstream of the throttle valve 20 in the suction path 19 to a surge tank 41 located at the downstream thereof. An air bypass valve 43 for opening/closing the air bypass path 42 is disposed at a portion which couples with the surge tank 41. The air bypass valve 43 comprises a valve body 44, a valve 45 for opening/closing the air bypass path 42, a diaphragm 46 integrated with the valve 45, and a spring 47 for urging the above mentioned valve 45 through the diaphragm 46 so as to block the air bypass path 42. A negative pressure pipe 48 which induces a negative pressure for activating the above mentioned valve 45 is coupled with the negative pressure chamber in which the spring 47 is disposed.

The negative pressure pipe 48 is coupled with the throttle valve 20 at the upstream thereof and a solenoid valve 49 is provided in the course of the negative pressure pipe 48. This solenoid valve 49 is activated to generate a negative pressure to the air bypass valve 43, thereby opening the air bypass valve 43. The opening/closing of the solenoid valve 49 is controlled by ON-OFF commands from the above mentioned ECU 18.

As mentioned above, the air supply mechanism of this unit is so composed of the air bypass valve 43, the solenoid valve 49 and the like.

Next, description is made in conjunction with the air-fuel ratio control method carried out by the unit mentioned above for changing the operation under the stoichiometric air-fuel ratio to the operation under the lean air-fuel ratio, according to an embodiment of the present invention. In this event, it is assumed that the engine 11 is a four-cylinder engine in this case.

In the engine 11 which is operated at the stoichiometric air-fuel ratio, transition to the operation under the lean air-fuel ratio begins in response to the establishment of the condition for changing to the lean air-fuel ratio. The transition to the operation under the lean air-fuel ratio is executed with, for example, such a condition that the degree of the opening of the throttle valve 20 is kept constant for a specified time interval.

Figure 2:
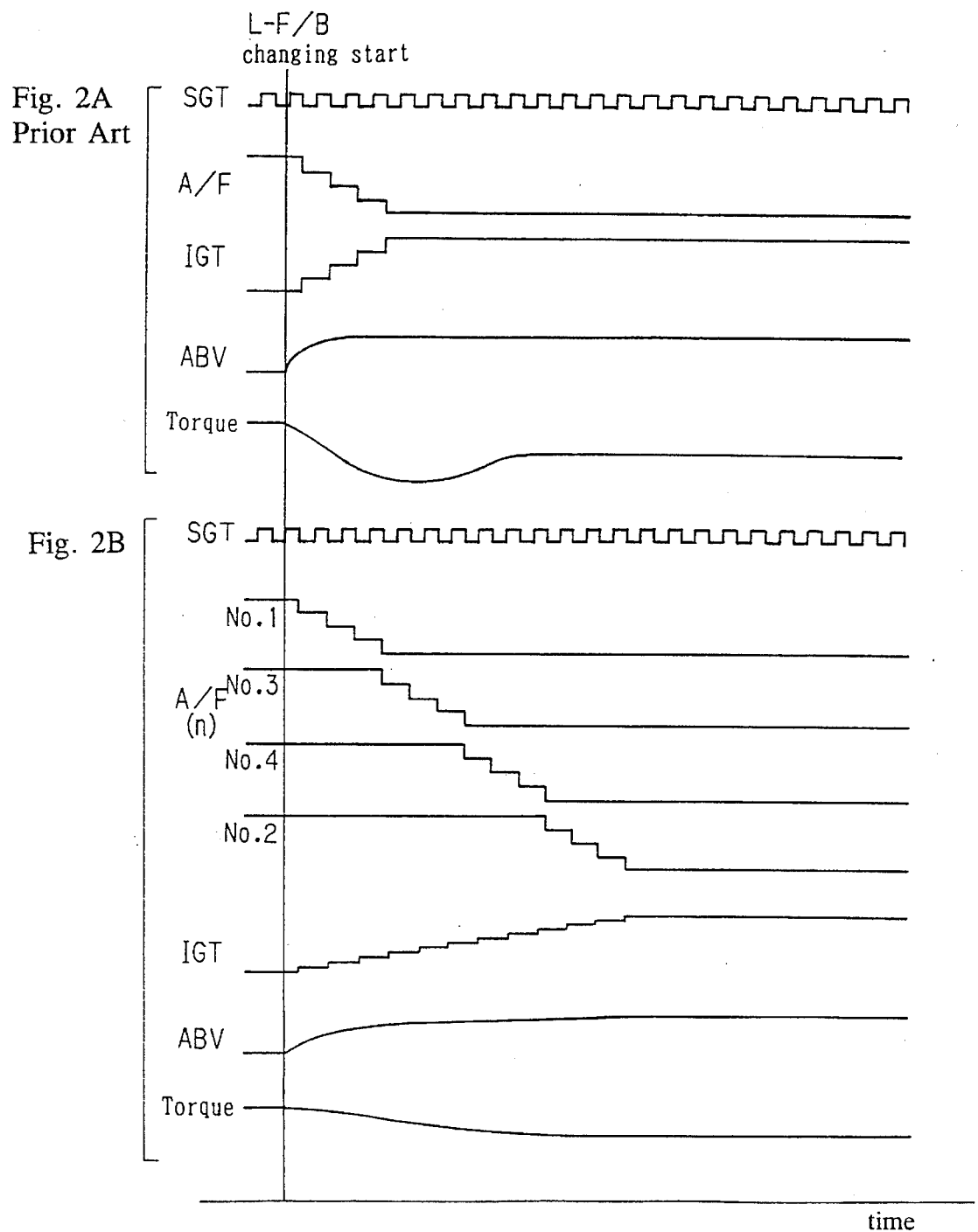
FIG. 2 is a timing chart showing the contents of air-fuel control according to an embodiment of the present invention and a conventional air-fuel control.

As shown in FIG. 2, control begins to change the air-fuel ratio A/F to the lean air-fuel ratio in one cylinder (for example, first cylinder) of the engine 11 in response to the trailing of signals SGT equivalent to signals from the crank angle sensor 34 when the above mentioned ECU 18 judges that the condition for transition to the operation under the lean air-fuel ratio has been established, In this embodiment, the air-fuel ratio A/F is increased through four steps, with the degree of the transition from the stoichiometric air-fuel ratio to the lean air-fuel ratio, namely a tailing coefficient being 0.25, to reach a target air-fuel ratio (for example, above 20). The control of the air-fuel ratio A/F is achieved by means of controlling the amount of fuel injected by the fuel injection valve 31. In addition, the injection timing is set to an optimum value.

If the air-fuel ratio A/F for the first cylinder changes to its target lean air-fuel ratio, successively, the air-fuel ratio A/F for the third cylinder is increased through four steps in order to reach its target lean air-fuel ratio. Likewise, the air-fuel ratio A/F is controlled successively with respect to the fourth cylinder and the second cylinder. Meanwhile, the transition speed for the change in the A/F ratio is assumed to be so quick as not to induce an increased generation of NOx. In parallel to the changing of the air-fuel ratio of respective cylinders, the above mentioned ECU 18 transmits ON-OFF commands to the solenoid valve 49. With the opening/closing of the solenoid valve 49, the suction negative pressure is introduced to the air bypass valve 43 through the negative pressure pipe 48, thereby opening the air bypass valve 43. If the air bypass valve 43 is opened, intake air enters the surge tank 41 through the air bypass path 42, thereby increasing the amount of suction air.

FIG. 2 shows changes of the degree of the opening of the air bypass valve 43 which is referred to as ABV. Because it takes a time to change from the stoichiometric air-fuel ratio operation to the lean air-fuel ratio operation, the air bypass valve 43 is opened later after the changing begins, and it is opened fully in the time needed for changing from the stoichiometric air-fuel operation to the lean air-fuel ratio operation. To open the valve later after the changing begins, a delay of the operation of that system can be used for this purpose.

The changing of the degree of the opening of the air bypass valve 43 is slowed down by changing the diameter of the negative pressure path of the air bypass valve 43 in order to change the response.

Further, the duty control of the air bypass valve 43 allows more precise control corresponding to a drop of the torque.

It is necessary to advance the ignition timing of the engine 11 in response to the change into the lean air-fuel ratio. The above mentioned ECU 18 calculates this ignition advance angle to control the ignition timing. FIG. 2 shows the ignition advance angle with the ignition timing referred to as IGT.

FIG. 2 shows changes of the torque during changing of the air-fuel ratio. FIG. 2 also shows changes of the air-fuel ratio, changes of the ignition timing, changes of the degree of the opening of the air bypass valve and changes of the torque during simultaneous changing of the air-fuel ratio in a conventional four-cylinder system.

As apparent from FIG. 2, by changing the stoichiometric air-fuel ratio to the lean air-fuel ratio with a timing delay with respect to respective cylinders, the air supply amount upon the change is increase. Consequently, a drop of the engine torque upon changing to the lean air-fuel ratio is reduced to prevent the engine hesitation from being caused.

This embodiment increases the air supply amount gradually in a substantially equal time from the start of changing to the target air-fuel ratio to termination thereof by means of controlling the solenoid valve 49. Accordingly, it is possible to increase the air flow substantially during the entire interval in which the torque change occurs, thereby maintaining control of the reduction of torque.

Further, it is possible to adjust increases of the air flow substantially accurately by controlling the solenoid valve 49.

Still further, by changing the air-fuel ratios of the cylinders which are disposed longitudinally in order of the first, second, third and fourth cylinders, in the order of the first, fourth, third and second cylinders, it is possible to prevent an occurrence of vibration due to imbalance of torque between the cylinders.

Figure 3:
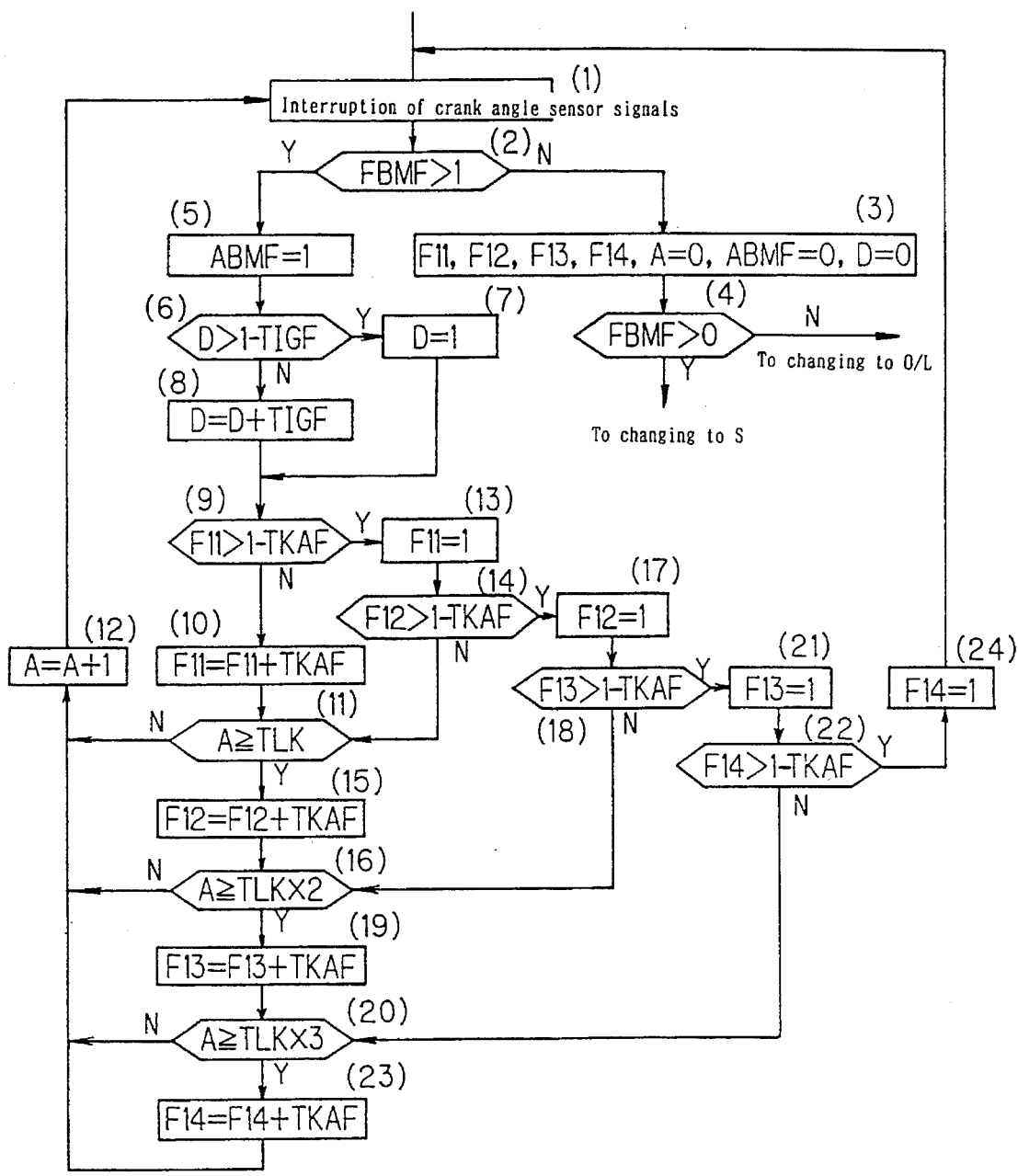
FIG. 3 is a flow chart according to an embodiment of the present invention.
Figure 4:
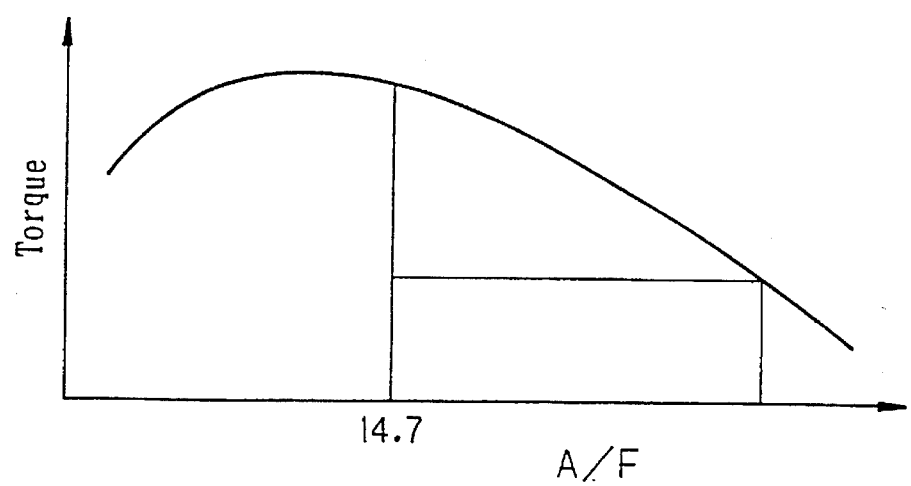
FIG. 4 is a graph showing the relationship between the air-fuel ratio and torque.
Figure 5:
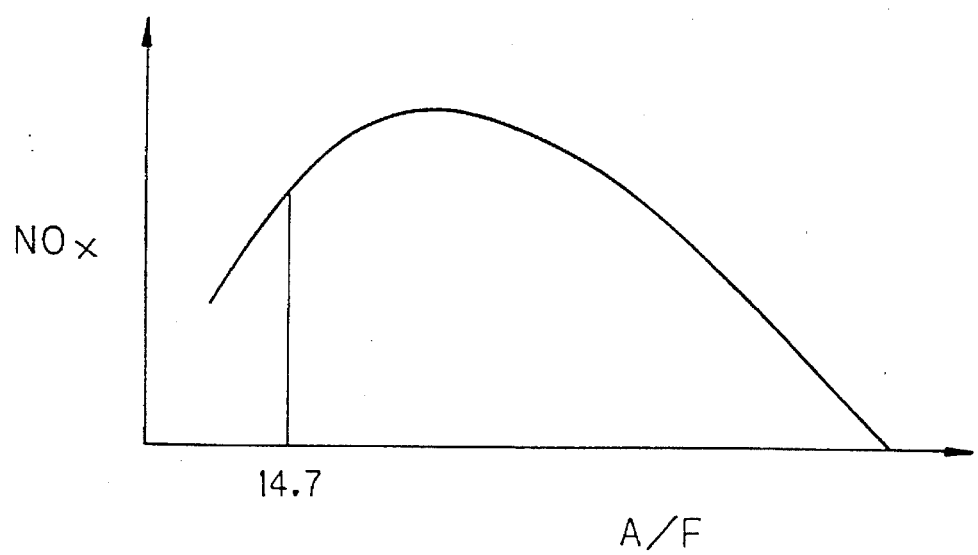
FIG. 5 is a graph showing the relationship between the air-fuel ratio and NOx.

Next, the air-fuel ratio control method according to the embodiment of the present invention is described with reference to a flow chart shown in FIG. 3. In this process flow, the target air-fuel ratio AF(n) can be obtained with the formula (1) below.

$$AF(n)=(1-F(N))\times AFS(n)+F(n)\times AFL(n) \qquad (1)$$

where F(n) is a target A/F correction coefficient, AFS(n) is a target air-fuel ratio under the stoichiometric air-fuel ratio operation, and AFL(n) is a target air-fuel ratio under the lean air-fuel ratio operation. A target ignition timing can be obtained with the formula (2) below.

$$IG=(1-D)\times EGS+D\times IGL \qquad (2)$$

where D is a correction coefficient of the target ignition timing, IGS is an ignition timing under the stoichiometric air-fuel ratio operation, and IGL is an ignition timing under the lean air-fuel ratio operation.

If an interruption of crank angle sensor signal corresponding to the trailing of SGT signals (step (1)) occurs, the operating status is determined. The operating status is determined by an F/B mode determining flag FBMP. When the F/B mode determining flag FBMF is "2", the lean air-fuel ratio operation is indicated. When it is "1", the stoichiometric air-fuel ratio operation is indicated. When it is "0", an open loop (cases other than the lean air-fuel ratio operation and the stoichiometric air-fuel operation) is indicated.

In step (2), it is determined whether or not the F/B mode determining flag FBMF is "1". In this case, the determination of the lean air-fuel ratio operating status is achieved according to the degree of the opening of the throttle, the rotation speed of the engine, the velocity of a vehicle and the like.

If it is determined that the F/B mode determining flag FBMF is not above "1", the lean air-fuel ratio operating status is not being carried out. Then, in step (3), all flags described below are set to "0", namely reset, and then it is determined whether or not the F/B mode determining flag FBMF is above "0" (step (4)). That is, it is determined whether the engine is in an operation other than the lean air-fuel ratio operating status and the stoichiometric air-fuel ratio operating status. If it is determined at this step (4) that the F/B mode determining flag FBMF is not above "0", the engine is in a status of, for example, starting. Thus, changing to open loop (O/L) is performed. If it is determined that the F/B mode determining flag FBMF is above "0" at step (4), the F/B mode determining flag is "1", so that the lean air-fuel ratio operating status is changed to the stoichiometric air-fuel ratio operation status (S).

If it is determined that the F/B mode determining flag FBMF is above "1" at step (2), namely that the lean air-fuel ratio operation is executed, the ABV drive determining flag ABMF is set to "1" (step (5)) and an opening command is dispatched to the air bypass valve 43.

Next, whether tailing at the time of ignition has terminated is determined (step (6)). That is, the control determines whether the target ignition timing correction coefficient D is larger than "1-TIGF". The target ignition timing correction coefficient D is "1" when the lean air-fuel ratio operating status is executed, and is "0" when the stoichiometric air-fuel ratio operating status is executed. In this event, TIGF represents an ignition timing tailing coefficient.

When it is determined that the tailing at the time of ignition has terminated, that is, "D>1-TIGF" at step (6), this step proceeds to step (7) and then tailing terminates with "D=1".

When it is determined that the tailing has not been completed yet at step (6), the ignition timing tailing coefficient TIGF is added to the above mentioned D. That is, "D=D+TIGF" is applied (step (8)). This is expressed by the fact that IGT is enlarging gradually in FIG. 2.

Next, it is determined whether the air-fuel ratio controlled tailing for respective cylinders has terminated. First, it is determined whether tailing of the first cylinder to be controlled first of all has terminated. That is, it is determined whether the target A/F correction coefficient F11 of a cylinder to be controlled first is larger than "1-TKAF" (step (9)). Concretely, because when the lean air-fuel ratio operation begins, "F11=0" in the case when the tailing coefficient is 0.25, "0>1-0.25" is induced, so that a negative result, "NO" is obtained.

If step (9) is negative, the A/F tailing coefficient TKAF is added once to the above mentioned target A/F correction coefficient F11 (step (10)).

Next, it is determined whether the product A of the tailing process up to now is larger than the number TLK of the A/F tailing processes (for example, four steps of processing) (step (11)). If the product A of the number of the tailing processes is below the TLK, the current product is incremented by 1 (step (12)), and then the process returns to control start in order to repeat the above-mentioned tailing process.

When the tailing of a predetermined number of processes is executed, it is determined that F11 is larger than "1-TKAF" at step (9). That is, first, it is determined that the air-fuel ratio controlled tailing for the cylinders has terminated and F11 is reset (F11=0) (step (13)).

Then, it is determined whether the A/F tailing of a cylinder to be controlled second has terminated. That is, it is determined whether or not the target A/F correction coefficient F12 of a cylinder (the third cylinder) to be controlled second is larger than "1-TKAF" (step (14)).

Because F12=0 holds just after the process proceeds to control of the second cylinder, "NO" is determined. After "NO" is determined, the process proceeds to step (11) where it is determined whether the product A of a number of tailing processes is larger than the number TLK of the A/F tailing processes. Because the tailing of the first cylinder is terminated, this step becomes affirmative, giving a result of "YES". If "YES" is determined, the A/F tailing coefficient TKAF is added to F12 once (step (15)).

Next, it is determined whether the A/F tailing to a cylinder to be controlled second has terminated. More specifically, it is determined whether the product A of tailing processes up to now is twice larger than the number TLK of the A/F tailing processes (step (16)). If the product A of the number of tailing processes is below "TLK×2", the current product is incremented by 1 (step (12)) and then the process returns to step (1) to repeat the above-mentioned tailing process.

In the same manner as the first cylinder, the A/F tailing of the second cylinder is executed and further, in the same manner, the A/F tailing process for the cylinders (the fourth cylinder, the second cylinder) to be controlled third and fourth is executed (steps (17)–(23)).

When the A/F tailing for all the cylinders is terminated, step (22) becomes positive, giving a result of "YES". Thus, F14 is set to 1 (step (24)) and the process returns to start of the control.

During the lean air-fuel ratio operating status, the steps (6), (7), (8), (9), (13), (14), (17), (18), (21), (22), (24) are repeated to maintain the lean air-fuel ratio operating status.

While the above-described embodiment has thus been described in conjunction with a case where the present invention is applied to a four-cylinder engine, the present invention may be applied to engines having other numbers of cylinders. The sequence of the cylinders subject to air-fuel ratio control is not limited to the above-described case, and may be selected so as to produce an effect of preventing vibration depending on the number of cylinders.

While the above mentioned embodiment is in conjunction with the A/F tailing coefficient of 0.25, this value may be modified adequately.

While the above embodiment has been described in conjunction with the target air-fuel ratio changed from the stoichiometric air-fuel ratio to the lean air-fuel ratio, the same effect can be obtained by means of performing the same control procedure when changing from the lean air-fuel ratio to the stoichiometric air-fuel ratio.

The present invention can be applied not only to a case where the feedback control on the air-fuel ratio is performed depending on the target air-fuel ratio, but also to a case where the open loop control on actual air-fuel ratio is performed so as to reach the above mentioned target air-fuel ratio.

We claim:

1. An air-fuel ratio control method for selecting a stoichiometric air-fuel ratio and a lean air-fuel ratio as a target air-fuel ratio for an engine to control the air-fuel ratio of the engine depending on the selected target air-fuel ratio, said engine having multiple cylinders, variable ignition timing control, and variable intake air flow control, said method comprising:

changing said air-fuel ratios for each said cylinder over respectively offset timing intervals during said changing of said air-fuel ratio to said target air-fuel ratio; and varying intake air flow during said change.

2. The air-fuel ratio control method as claimed in claim 1, wherein for each cylinder, the air-fuel ratio change is made in a plurality of increments or decrements.

3. The air-fuel ratio control method as claimed in claim 2, wherein each of said increments or decrements have a predetermined value.

4. The air-fuel ratio control method as claimed in claim 1, wherein said engine further includes a suction path and a throttle valve in said path, and wherein said step of varying said intake air flow includes bypassing said throttle valve in said suction path.

5. The air-fuel ratio control method as claimed in claim 1, wherein intake air flow is varied gradually over an interval substantially similar to and coextensive with the duration of said changing of said air-fuel ratio.

6. The air-fuel ratio control method as claimed in claim 1, wherein said intake air flow is changed gradually by selective control of said variable intake air flow control.

7. The air-fuel ratio control method as claimed in claim 6, wherein said variable intake air flow control include an intake suction path, a throttle valve in said suction path, a bypass passage in said suction path around said throttle valve, and a bypass control valve in said bypass passage, including the step of gradually opening or closing said bypass control valve to gradually change said intake air flow.

8. The air-fuel ratio control method as claimed in claim 1, wherein the timing of the air-fuel ratio is changed among cylinders of a given cylinder arrangement in that sequence of cylinders precluding vibration from such timing change.

9. The air-fuel ratio control method as claimed in claim 1, wherein an ignition timing of the engine is advanced gradually along with the changing of the air-fuel ratio when said stoichiometric air-fuel ratio is changed to said lean air-fuel ratio.

10. The air-fuel ratio control method for selecting a stoichiometric air-fuel ratio and a lean air-fuel ratio as a target air-fuel ratio for an engine to control the air-fuel ratio of the engine depending on the selected target air-fuel ratio, said engine having a plurality of cylinders and ignition timing controls, said method comprising:

gradually changing respective air-fuel ratios, in said plurality of cylinders over respective time periods deviating between said cylinders;

said gradual change in each said air-fuel ratio being made in increments or decrements.

11. The air-fuel ratio control method as claimed in claim 10, including varying an ignition timing gradually in increments or decrements over an interval commencing with the beginning of the first of said air-fuel ratio changes and ending with the completion of the last such change.

12. An air-fuel ratio control method for selecting a stoichiometric air-fuel ratio and a lean air-fuel ratio as a target air-fuel ratio for an engine to control the air-fuel ratio of the engine depending on the selected target air-fuel ratio, said engine having multiple cylinders, variable ignition timing control, and variable intake air flow control, said method comprising:

changing said air-fuel ratios for each said cylinder over respectively offset timing intervals;

varying ignition timing over all of said offset timing intervals until said change has been completed between said stoichiometric and said lean air-fuel ratios; and varying intake air flow during said change.

13. The air-fuel ratio control method as claimed in claim 12, wherein for each cylinder, the air-fuel ratio change is made in a plurality of increments or decrements.

14. The air-fuel ratio control method as claimed in claim 13, wherein each of said increments or decrements have a predetermined value.

15. The air-fuel ratio control method as claimed in claim 12, wherein said engine further includes a suction path and a throttle valve in said path, and wherein the step of varying said intake air flow includes bypassing said throttle valve in said suction path.

16. The air-fuel ratio control method as claimed in claim 12, wherein the intake air flow is varied gradually over an interval substantially similar to and coextensive with the duration of said changing of said air-fuel ratio.

17. The air-fuel ratio control method as claimed in claim 12, wherein said intake air flow is changed gradually by selective control of said variable intake air flow control.

18. The air-fuel ratio control method as claimed in claim 17, wherein said variable intake air flow control include an intake suction path, a throttle valve in said suction path, a bypass passage in said suction path around said throttle valve, and a bypass control valve in said bypass passage, including the step of gradually opening or closing said bypass control valve to gradually change said intake air flow.

19. The air-fuel ratio control method as claimed in claim 12, wherein the ignition timing is changed among cylinders of a given cylinder arrangement in that sequence of cylinders precluding vibration from such timing change.

20. The air-fuel ratio control method as claimed in claim 12, wherein the ignition timing of the engine is advanced gradually along with the changing of the air-fuel ratio when stoichiometric air-fuel ratio is changed to lean air-fuel ratio.

* * * * *